Figure 7:
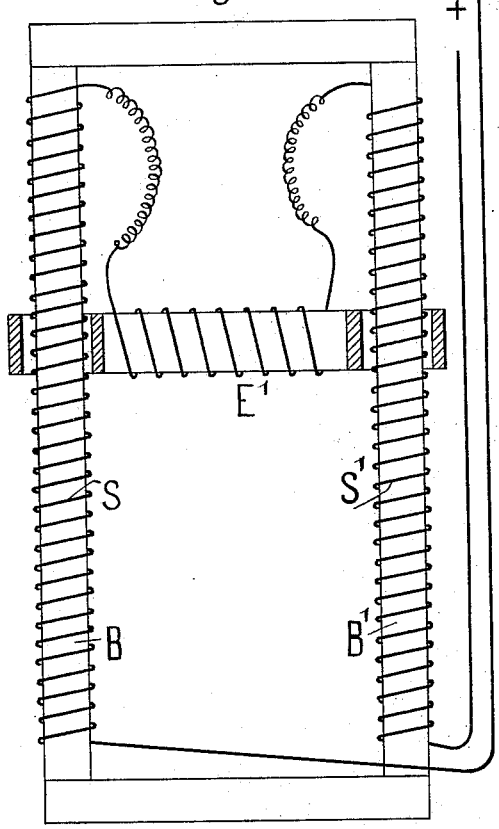

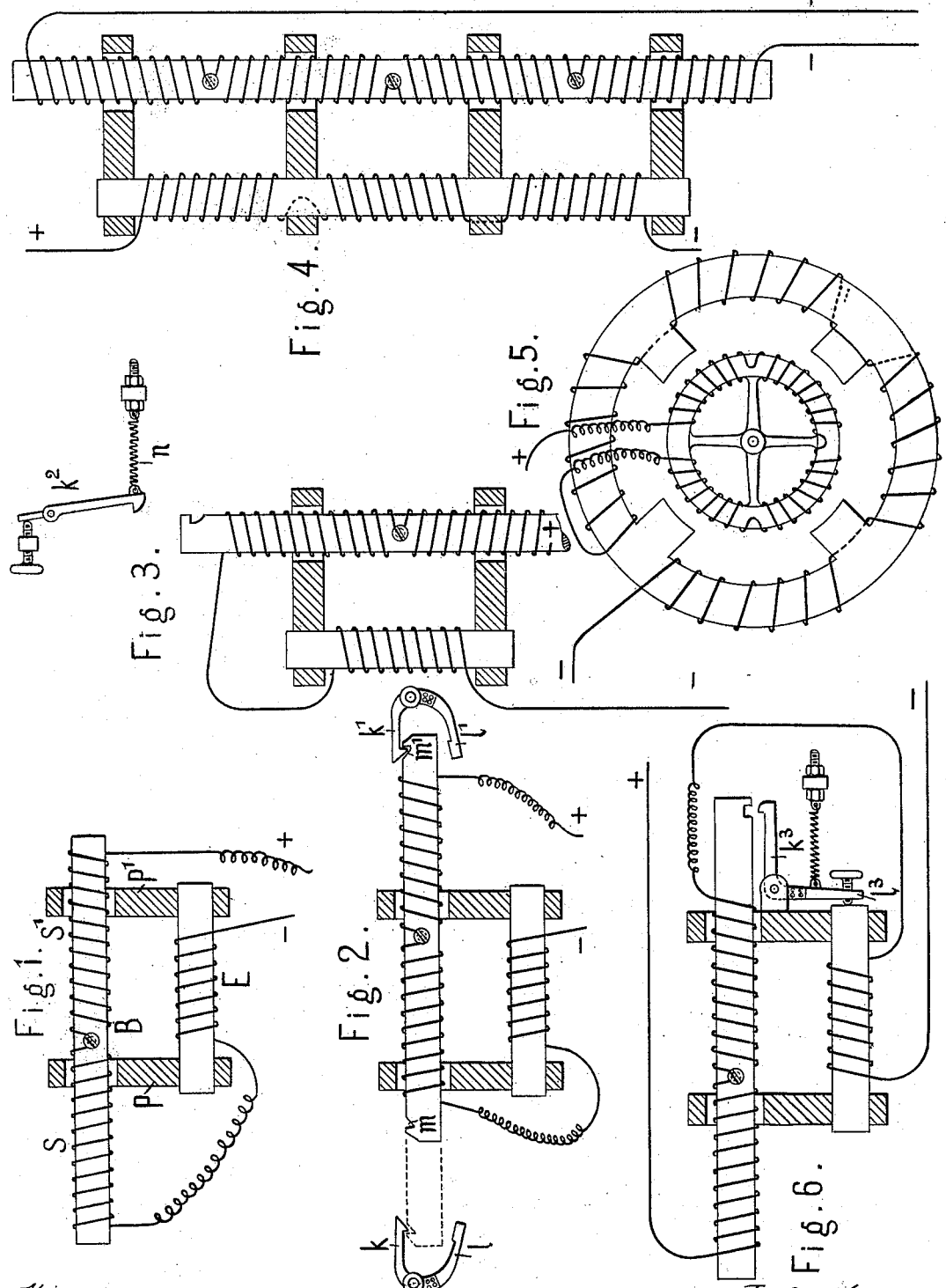

(No Model.) 2 Sheets—Sheet 2.

H. PIEPER, FILS.
RECIPROCATING ELECTRIC MOTOR.

No. 507,449. Patented Oct. 24, 1893.

Witnesses:
Ewella Dick
L. C. Hills

Inventor:
Henri Pieper Jr.
by Marcellus Bailey, Atty

UNITED STATES PATENT OFFICE.

HENRI PIEPER, FILS, OF LIEGE, BELGIUM.

RECIPROCATING ELECTRIC MOTOR.

SPECIFICATION forming part of Letters Patent No. 507,449, dated October 24, 1893.

Application filed September 23, 1891. Serial No. 406,583. (No model.) Patented in Belgium January 6, 1890, No. 89,087; in Germany January 18, 1890, No. 55,169; in England March 14, 1890, No. 4,000; in France June 13, 1890, No. 206,343, and in Austria-Hungary September 24, 1890, No. 22,689 and No. 44,827.

*To all whom it may concern:*

Be it known that I, HENRI PIEPER, Fils, a subject of the King of Belgium, residing at Liege, Kingdom of Belgium, have invented new and useful Improvements in Reciprocating Electric Motors and Regulators, (for which I have obtained Letters Patent in Belgium, dated January 6, 1890, No. 89,087; in Germany, dated January 18, 1890, No. 55,169; in Great Britain, dated March 14, 1890, No. 4,000; in France, dated June 13, 1890, No. 206,343, and in Austria-Hungary, dated September 24, 1890, No. 22,689 and No. 44,827,) whereof the following is a specification.

My invention consists in an electric device for producing motion of limited range with constant force and applicable as motor and as regulator.

The said device substantially consists in an electro-magnet provided with two pole-pieces, an armature constantly closing the magnetic circuit in being separated from the pole pieces by very small holes or spaces forming magnetic field spaces, and a pair of reversely wound magnetizing coils fixed upon the said armature in a line with and electrically connected to each other by their inner ends so as to form one continuous conductor of which the one half reaches through the one of said magnetic field spaces in being wound in the one direction, while the other half passes through the other of the said spaces in being wound in the opposite direction. Besides this, the coil carrying armature and the electro-magnet are so arranged as to permit a relative motion to take place between them. Each armature coil is longer than the space within which it is to act, and the range of motion is so limited that the number of convolutions of each coil in the respective space will always remain the same. If under these circumstances a current is caused to circulate through the armature coils the reciprocal action of the magnetic field and the current, will generate a force tending to cause a relative motion between the electro-magnet and the armature, and this force will be in proportion directly to the current circulating in the armature coils and to the intensity of the magnetic field. Therefore, as long as in each magnetic field space the number of convolutions of the respective armature coil is constant or unvaried, the said force will also remain constant or unaltered.

In motors of great power the electro-magnet will be constructed with three or more pole pieces and the armature provided with a like number of coils, one coil for each space and all the coils so arranged that when a current circulates through them, the forces resulting from the action of the latter on the several magnetic fields will act in the same direction.

The armature may consist in a straight iron bar, or it may be bent to form an arc of a circle or a full ring, the poles of the electro-magnet being arranged accordingly. In the first case the motion of the armature is rectilinear, and in the second case it is oscillating. Furthermore the said bar may be plain or divided.

If the described device is to be employed as a motor, a switch is combined therewith, arranged to be shifted either by the movable part of the device, or by hand, or by any other means, and which serves to interrupt and re-establish, or to reverse the current in the coil of the electro-magnet or in those of the armature, or the combination is fed with alternating currents of feeble frequency. The motor thus obtained produces motion either in one direction at a time, or in alternating directions. The same is capable of useful application for driving machine-tools, pumps, &c., and for regulating purposes.

For some purposes it is desirable to automatically arrest the movable part of the motor at one or both ends, or at any other point, of its stroke. In view hereof I arrange in the path of the movable part (which will ordinarily be the armature) a pawl adapted to engage with a shoulder on the armature, and which is either brought into engagement with the said shoulder or disengaged therefrom through the magnetism of the armature or of the electro-magnet.

Figure 8:
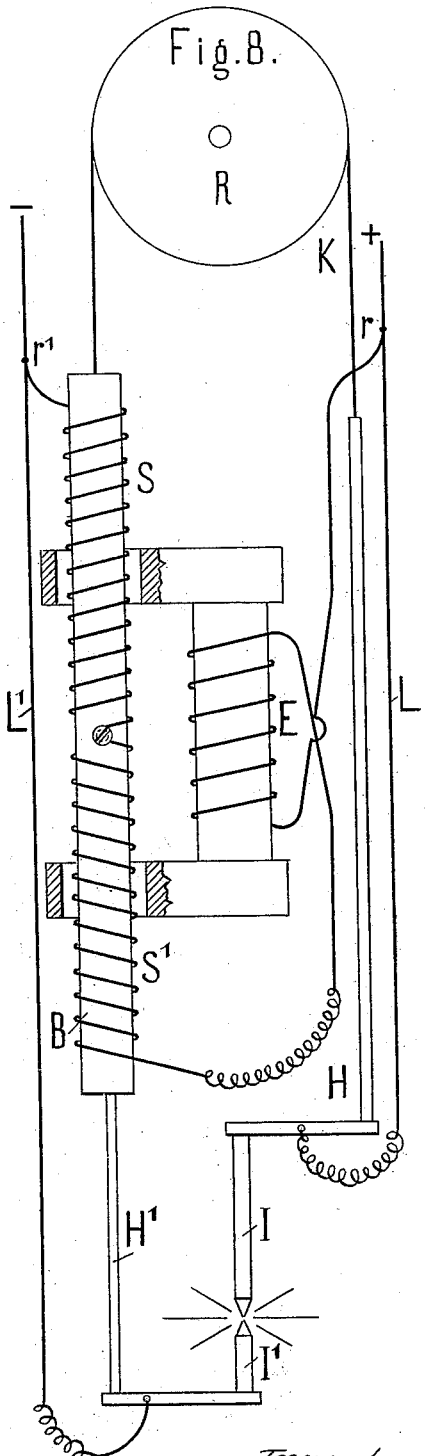
Figure 9:
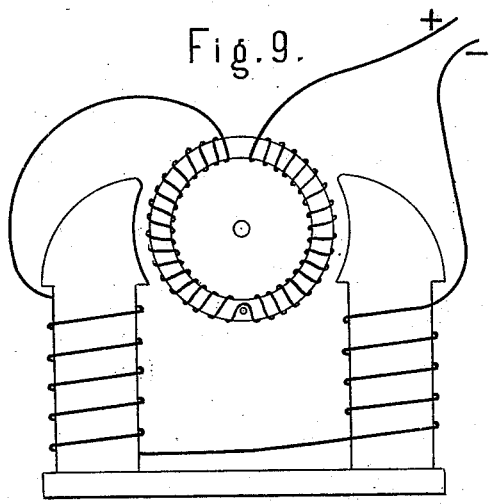

In the annexed drawings Figure 1 is a motor carried out according to my invention. Figs. 2 and 3 are views of motors with arresting pawls. Fig. 4 shows a motor with straight multipolar electro-magnet and straight armature; Fig. 5 a motor with circular multipolar magnet and circular armature. Fig. 6 is a view of another arrangement of a motor with arresting pawl. Fig. 7 shows an electro-magnet and armature in which the former is movable. Fig. 8 represents the electric device applied as regulator to an electric arc lamp. Fig. 9 shows a motor with circular bipolar magnet and circular armature.

The motor represented by Fig. 1 is composed of the electro-magnet E having the pole-pieces P P', which are perforated, the iron bar B forming the armature, and the two coils S S' surrounding the armature and fixed thereto, the said coils being wound in opposite directions, but forming one continuous conductor. The armature passes with the coils S S' through the perforations of the pole-pieces P P' of the electro-magnet and it is movable therein lengthwise. The coils S S' have such length, that, during the motion of the armature, the coils will always remain with the same number of convolutions in the magnetic field formed by the pole-pieces P P' and the armature. If the armature is subject to be moved in one direction by any other force than electricity, such as gravity or spring-power, which is the case if, for instance, it is placed with its armature vertical, it requires for its automatic motion an alternate making and breaking of the current only.

One arrangement of the means for arresting the armature is shown by Fig. 2. The same consists in two pawls $k$ and $k'$ turning on fixed pivots and adapted to automatically engage in the notches $m$ and $m'$ cut into the armature, the latter being secured, after interruption of the current, against accidental backward displacement, as soon as the pawl $k$ has dropped into the notch $m$, or pawl $k'$ into notch $m'$. For the purpose of disengaging the pawls whenever the current is established for shifting the armature, the pawls are made of a metal not acted upon by magnetism, and each pawl is provided with an iron arm $l$ $l'$ respectively, which has such form that, when it is attracted by the armature magnetized by the current the engaged pawl will be raised so as to leave the armature free to move. Certainly the magnetized armature will at each end of its course tend to attract the arm $l$ or $l'$, and to keep the corresponding pawl raised; but as soon as the current is broken, the attraction ceases and the pawl drops into the notch.

Fig. 3 shows an arresting device applied to a vertically movable armature, and which, contrarily to the foregoing one, sustains the armature as long as the same is magnetic, i. e., as long as the current is through its coils. The pawl $k^2$ is, in this case, made of iron, and it is withdrawn by a spring, $n$, after the current circulating in the coils of the armature is broken. With this arrangement the current may after the raising of the armature, be diminished in strength up to the point at which the magnetism of the armature is just sufficient to keep the pawl in engagement. The pawl may also be disposed to be actuated by the magnetism of the electro-magnet, as represented by Fig. 6. For this purpose it is constituted by an arm $k^3$ not subject to be acted upon by magnetism, and an iron arm $l^3$, the two arms forming together an elbow-lever pivoted to a bracket of non-magnetic metal on the electro-magnet. The arm $k^3$ forming the pawl is brought into engagement with the notch in the armature when the current circulating around the electro-magnet, is broken, whereas disengagement takes place when the said current is established and the electro-magnet attracts the arm $l^3$.

The multipolar arrangements of the motor represented by Figs. 4 and 5 will be understood from the foregoing without further description.

By reducing the number of poles of the field magnet of motor Fig. 5 and that of the coils of the armature to two, a bi-polar circular arrangement will be obtained as shown in Fig. 9. In this case the direction of the current in all the circuits and the forces generated thereby are identical with those produced in a continuous current dynamo motor. In all cases the coil or coils of the electro-magnet and those of the armature may be placed in the same circuit or in different circuits, the latter arrangement taking place when the armature coils are to be fed with alternating currents.

While in the described arrangement the electro-magnet is stationary and the armature movable, Fig. 7 shows a movable electro-magnet E' combined with an armature formed by the rods B B', magnetically connected together at their ends by iron bars, the said rods B B' having wound around them the respective coils S S'.

Fig. 8 represents the combination of the electro-magnet E and a coil carrying armature B applied as a regulator to an electric arc lamp. I and I' are the two carbons, H and H' the carbon-holders. The holder H' is fixed to the bottom end of rod B, while the holder H is suspended to a cord or chain K, passing over a pulley R and fixed with its other end to the top of rod B. The main conducting wires L L' are electrically connected to the respective holders H H', while the regulator is placed in a shunt-circuit branched off from the wires L L' at $r$ and $r'$, and the connections are made in such manner that a current passing through the wires from $+$ to $-$, will tend to raise the lower carbon-holder H', whereas the said holder and the rod B, being together heavier than the holder H, will cause the carbons to separate from each other when there is no current. As soon as the lamp is switched into circuit, the current, passing first through the shunt only, will cause the bar B to rise, so that contact between the carbons is established. The main current then passes through the carbon to produce the arc, while the shunt current diminishes. In consequence the rod B and the lower carbon holder will descend again with the effect of increasing the length of arc. The shunt-current therefrom also increases again and causes a new rising of the bar B. Finally a state of equilibrium results in which the excess of weight of the rod B and holder H′ over that of the holder H is counter balanced by the force tending to raise the rod B. By duly regulating the said excessive weight, the proper length of arc is obtained. When, at the time the lamp is burning, the arc becomes longer from consumption of the carbons, the shunt-current becomes stronger again and a renewed operation of the regulator sets in, whereby the distance between the carbons is reduced again.

I am aware that it is a well known fact that a coil of wire placed in suitable position in a magnetic field, has the tendency to move when an electric current flows through it. I am also aware that for certain purposes a coil has heretofore already been employed in combination with a magnetic field formed by the two poles of a permanent magnet, the coil being shorter than the field and placed around one of the poles of the magnet. I am further aware that an electro-magnet of straight shape having three poles has been combined with a conductor coiled upon one of its poles and being longer than the magnetic field. I therefore do not broadly claim the combination of a coil and a magnetic field, but

What I claim as my invention is—

1. The combination with an electro-magnet having two or more pole pieces and an iron armature so arranged as to continuously close the magnetic circuit or circuits through small spaces and to permit a relative motion between it and the armature, of two or more coils fixed upon the armature and so arranged that there is one coil in each of said spaces, the coils being successively wound in opposite direction and each of them being longer than the respective space, substantially as described.

2. The combination of an electro-magnet having two or more poles pieces, and an iron armature so arranged as to continuously close the magnetic circuit or circuits through small spaces and to permit a relative motion between it and the armature, two or more coils arranged upon the armature as described, and electric circuit or circuits connected with the said armature coils and electro-magnet and a device for arresting the armature consisting in a shoulder on the latter and a pawl capable of being engaged with the latter and acted upon by a magnetized part of the combination, substantially as described.

In testimony whereof I have hereunto set my hand in the presence of two subscribing witnesses.

HENRI PIEPER, Fils.

Witnesses:
JAMES R. DANFORTH,
J. ROMEYN DANFORTH.